Feb. 21, 1967 T. BAEHNI 3,304,708
ELECTRIC WRISTWATCH AND ELECTRIC POWER CELL
HAVING ELECTRODE PLATES HAVING ONE PLATE
OF PROJECTIONS FITTING IN APERTURES
OF ANOTHER PLATE
Filed May 11, 1965 4 Sheets-Sheet 3

United States Patent Office 3,304,708
Patented Feb. 21, 1967

3,304,708
ELECTRIC WRISTWATCH AND ELECTRIC POWER CELL HAVING ELECTRODE PLATES HAVING ONE PLATE OF PROJECTIONS FITTING IN APERTURES OF ANOTHER PLATE
Thomas Baehni, Rue du Musee-Bienne, Switzerland, assignor to Baehni & Co., Bienne, Switzerland, a company of Switzerland
Filed May 11, 1965, Ser. No. 459,143
Claims priority, application Switzerland, Mar. 8, 1961, 2,804/61
6 Claims. (Cl. 58—23)

This is a continuation-in-part of my application Serial No. 178,163, now abandoned, filed March 7, 1962, and claiming a priority of filing in Switzerland of March 8, 1961.

The present invention relates to a galvanic cell, and more particularly to an arrangement of electrodes which are electrochemically different from each other.

It is an object of the present invention to provide an electrode arrangement, and electrodes, which when brought into contact with the skin of human user, form a galvanic cell without the use of any additional electrolyte other than the skin itself, and to provide electrical output current to a load, such as for example, the motor of a watch.

It is a further object of the present invention to provide a small and compact source of electrical power which is free from maintenance and readily applied to an insulating support, which has a long usefulness and shelf life, without deterioration.

Briefly, in accordance with the invention, a pair of electrodes are formed on an insulating support, such as for example an insulating back for a watch, a fabric, or the like, spaced from each other, and adapted for connection to an external electrical circuit. The electrodes may be in the form of wires, or strips, which may be interleaved or arranged in parallel. One of the electrodes, the anode, consists of material such as magnesium, zinc, aluminum, carbon or graphite, beryllium, cadmium, and alloys of these materials; the cathode consists of a material such as silver, nickel, copper, iron, gold, platinum, or alloys thereof, carbon, and porous graphite. The electric power obtainable is in the order of one-half volt, and approximately 30 to 40 $\mu$A.

An electrical cell according to the invention has many uses. For example, if an electrical current is to be generated to execute a control function, a person need only touch both electrodes, for example with a finger or by grasping the electrodes by hand. If a constant electrical potential is to be generated, for example to control an electrical wristwatch, the electrodes may be mounted on the back of a wristwatch, or its band, in such a manner that they are bridged by the skin of the wearer when the watch is being worn.

It is known to utilize two different metals forming electrodes in order to achieve medical or physiological effects, by contacting different electrodes with the human body in such a manner that a current is generated between the electrodes. In this case any dampness or fluids within the body in which the electrodes are used at the same time form the electrolyte as well as the path for the resulting current. In particular, skin which is dampened by perspiration has been used as electrolytes and as such a current path.

The present invention departs from the concept of utilizing the human body simultaneously as a generator of electricity and as the current path, so to speak, as the load between the electrodes. In contrast thereto, the electrochemical effect between the electrodes and the human skin is utilized in order to form a battery, that is a galvanic cell in the classic sense, to be connected to an external load. Heretofore it has not been considered possible to utilize the human body and the human skin to such purpose, probably because it was not believed possible to achieve potentials which are measurable and furthermore reasonably uniform, both with respect to time as far as a user is concerned, and as far as different persons are concerned, in order to provide a useful and constantly operating source. It has also heretofore been believed that the normal, dry skin of a person would not as such function as an electrolyte, but had to be moistened or supplied with special lotions or gels; and thus, that to generate electricity only such areas of the human skin which are usually damp due to perspiration could be considered. It has also been believed that generating electricity by means of a pair of electrodes in contact with the human skin would be effective for only a very short time, if at all, due to polarization of the electrodes or passivation of the surface of the electrodes in contact with the skin.

The present invention is based on the realization that these beliefs were unfounded, and that a cell in contact with the human skin can function as an electrical power source. By suitable choice of the materials for the electrodes and arrangement of their surfaces which are brought into contact with the human skin, a positively operating, reliable galvanic battery is obtained.

The materials from which the electrodes are made must be compatible with the human body, that is they must not leave any irritation or toxic effects, and furthermore, they must be remote from each other within the electrochemical, electromotive series of elements to such an extent that they provide the minimum potential necessary to supply useful electrical energy. The common metal electrode of an electrode pair, that is the anode, preferably utilizes any one of the following metals, or alloys thereof: magnesium, zinc, aluminum, cadmium, and beryllium. The cathode is formed of a precious metal electrode such as silver, gold, platinum as well as nickel, copper and iron and suitable alloys of these elements, carbon, and porous graphite. All of the elements mentioned are compatible with the human body and the human skin and do not have toxic or irritating effects. In connection with the contact with the human skin, it has been found that pairs of precious and non-precious electrodes of the materials above mentioned provide a galvanic cell of the Leclanché type, that is a cell which is depolarized. Such a cell has these characteristics: The non-precious or common electrode does not show any tendency to passivation and is stable with respect to moisture. The electrolyte, that is the dry human skin, does not cause a spontaneous dissolution of this electrode. There appears to be an extremely small and experimentally hardly provable dissolution, the theory of which, and the mechanism of which, have not yet been scientifically determined. The precious or non-active electrode is chemically stable. Hardly any passivation or polarization, respectively, has been noted at the cathode, even after experiments over several months with a cell of magnesium-copper and another of magnesium-silver, in spite of the fact that no specific depolarizing agent has been added, which is usually done in connection with the above mentioned Leclanché elements and consists of solid manganese oxide.

It is currently believed that the electrochemical reactions at the surface contact between the human skin and the electrodes have this reaction, for example when magnesium is used as the common electrode:

$$Mg - 2e \rightarrow Mg^{2+} \qquad (1)$$

$$Mg^{2+} + 2PH^- \rightarrow Mg(OH)_2 \qquad (2)$$

Instead of Formula 2 it is possible that $Mg^{2+}$ and a salt decomposable with trace material present on the skin or in the air→hydrated magnesium salt, for example watery $MgCl_2$. The reaction product formed by the magnesium ions does not cause passivation of the noble metal electrode, according to experimental evidence.

Apparently a very minute generation of hydrogen occurs at the cathode, although this could not be shown experimentally. The hydrogen does not cause a polarizing current which might interfere with the useful current, but is free to escape. The reaction of the hydrogen with the oxygen of the air is apparently so small that it can be neglected. It is possible, however, that the presence of the oxygen aids in the escape of the hydrogen, so that the oxygen may have what may be termed a depolarizing effect.

Experiments have shown that reduction actually occurred at the noble metal electrode, and that silver or copper becomes bright and shiny in use. As has been mentioned, however, the evolution of gas is so small that it could not be experimentally verified. Furthermore, the dissolution of the common or non-noble electrode is extremely small. According to present experiments and estimates it is in the order of a few parts per million per year for a cell in constant operation.

The reasons why no polarization of the noble metal electrode occurs, thus making the cell useless after a certain period of time, can only be guessed at. The possible effect of oxygen of the air has been mentioned above. It is also possible that the human skin contains substances or emits or exudes substances which act as depolarizing agents, similar to chlorine in the known cell which are depolarized by chlorine. It is also possible that the constant relative motion between the human skin and the electrodes, which occurs during use of such a cell if it is worn against the skin or grasped, additionally mechanically removes any polarizing layer by merely rubbing them off. It is also to be considered that motions of the user constantly change the effective point of the contact between skin and electrode, and that the effective pressure between the skin and electrode again changes from point to point with any movement of the user. Thus, it appears probable that a constant change of the effective points of contact between electrode surface and skin surface occurs which further may contribute to prevention of depolarizing layers.

The art of cathodic corrosion prevention teaches that especially magnesium and zinc anodes are very useful as consumable electrodes, because their tendency to form passivating layers is very small. It has been noted experimentally that for the common or non-noble electrode of the cell, magnesium is particularly useful.

The structure, organization and operation of the invention will now be described more specifically in the following detailed description with reference to the accompanying drawings, in which.

Figure 13:
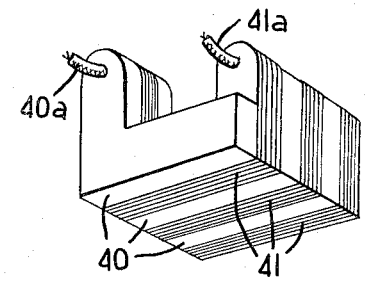
FIG. 13 is a form of the cells built up of parallel layers.

Before considering the drawings in detail, some experimental data and speculations of the operation insofar as it is presently understood, are of interest. Electrodes were constructed as shown in FIG. 13, in such a manner that each of the electrodes had an exposed surface of approximately 1 cm.² Disc or plate form electrodes, insulated from each other by an insulating adhesive, were arranged alternatingly next to each other. All plates 40 form one electrode and are connected to a common terminal 40A, while the plates 41, sandwiched therebetween, form the other electrode and are supplied with a common terminal 41A. The surfaces at the bottom of the electrodes, with respect to the drawing FIG. 13, are freely accessible. Each one of the electrodes may have a surface of approximately one-half times 10 mm. The measuring instrument was very sensitive and had an input resistance of $10^{12}$ ohms.

Electrode combination magnesium-silver: An open circuited, unloaded cell, touched by the finger, supplied 1.5 to 1.8 volts. Upon loading (expressed as current density units) the voltages observed were as follows:

| Current Density in $\mu A$/Per Sq. Cm.: | Terminal Voltage |
|---|---|
| 10–20 | 1.4 to 1.5 |
| 20–30 | 1.2 to 1.4 |
| 30–50 | 1.0 to 1.2 |
| 50–100 | 0.6 to 1.0 |

Electrode combination, magnesium-nickel: The unloaded cell has an output potential of 1.3 to 1.6 volts. Upon loading of 5 to 20 $\mu A$./sq. cm. Upon loading of 5 to 20 and 20 to 40 $\mu A$./sq. cm., respectively, output terminal voltage was 1.0 to 1.3 and 0.7 to 1.0 volts respectively.

Figure 1:
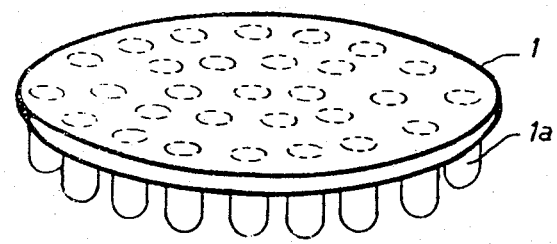
FIGS. 1 through 3 show an embodiment of the cell in which the common or non-noble electrodes are formed as pins on a support disc, and the noble metal electrode is a perforated disc.
Figure 2:
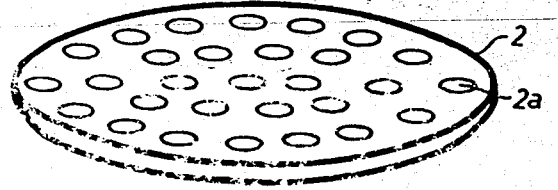
Figure 3:
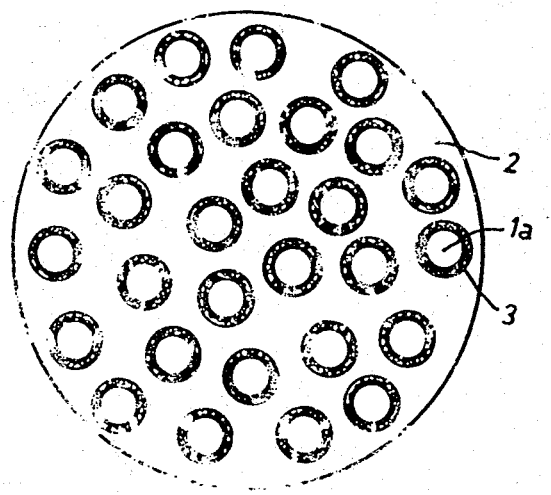

Experiments over one month were made with a cell consisting of magnesium-copper, as summarized in Table I below. This cell was built as shown in FIGS. 1 to 3 of the drawings, and was applied on the back of an electronic watch. The cell supplied the electronic watch by means of a floating buffer battery (see FIG. 15). The electrical energy required for the watch to run is approximately 16 micro watts. Numerals 1 to 10 on the first column of the table refer to ten different persons wearing the watch. The watch was worn by these persons during the entire period of time indicated in line 1 of the table. Again, a sensitive measuring instrument was used, this time of the bridge type. After one month the points on the skin where the watch had been used were examined. No changes, inflammation, or eczemas could be noted and none of the users felt anything unusual at the contact points of the electrodes with the skin.

TABLE I

|  | 10 sec. | | 60 sec. | | 1 hour | | 8 days | | 1 month | |
|---|---|---|---|---|---|---|---|---|---|---|
|  | μA | V | μA | V | μA | V | μA | V | μA | V |
| 1 | 51 | 0.61 | 59 | 0.57 | 58 | 0.43 | 55 | 0.50 | 49 | 0.42 |
| 2 | 19 | 0.50 | 27 | 0.42 | 35 | 0.40 | 34 | 0.45 | 37 | 0.40 |
| 3 | 42 | 0.45 | 39 | 0.45 | 41 | 0.50 | 44 | 0.43 | 41 | 0.40 |
| 4 | 37 | 0.40 | 50 | 0.51 | 42 | 0.35 | 47 | 0.60 | 45 | 0.51 |
| 5 | 27 | 0.47 | 21 | 0.55 | 29 | 0.42 | 35 | 0.55 | 30 | 0.47 |
| 6 | 29 | 0.66 | 36 | 0.37 | 43 | 0.48 | 39 | 0.42 | ----- | ----- |
| 7 | 47 | 0.51 | 47 | 0.40 | 46 | 0.52 | 50 | 0.40 | ----- | ----- |
| 8 | 32 | 0.55 | 22 | 0.45 | 30 | 0.58 | 29 | 0.52 | ----- | ----- |
| 9 | 21 | 0.55 | 35 | 0.52 | 37 | 0.58 | 31 | 0.65 | ----- | ----- |
| 10 | 33 | 0.45 | 36 | 0.55 | 35 | 0.60 | 43 | 0.40 | ----- | ----- |

Figure 9A:
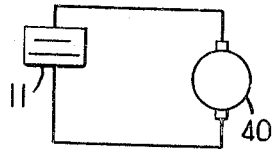
FIG. 9A is a circuit of a micromotor in circuit with the cell.

A magnesium-gold cell, in which the noble metal electrode (gold) was applied as the layer on a carrier of steel, was arranged in the form of an electrical touch control switch to supply an electrical micro-power motor (see circuit diagram, FIG. 9A). The cell was the sole source of power supply for such a motor. When both electrodes were touched by anyone, for example with the finger, the motor started. The cell is capable of driving such a motor, commercially available to operate between 1/10 and 8 volts; from 65 to 750 μA.; with a resistance of 210 ohms. Torque of from 0.011 to 0.220 cm.-gr. is provided, at a speed of from between 23 to 1,900 revolutions per minute. Starting values are 0.06 volt and current at 25 μA.

Other electrode combinations than those above mentioned and used experimentally may also be utilized. The data presented referred to electrodes of approximately 1 cm.$^2$ area, and an external load resistance of $10^5$ ohms. (Thus, current in the order of 10 micro amperes.) Electrode combination: Magnesium-iron 0.7 to 0.8 volt; Magnesium-gold or magnesium-platinum 1.4 to 1.6 volts; Graphite-copper 0.8 to 1.2 volts.

The common or non-noble material electrode should be as pure as possible. Even very small contamination of iron, nickel or copper, greatly increases inherent corrosion of the non-metal electrode by formation of internal, local elements. Certain metals may, and indeed preferably are, alloyed to the electrode to prevent polarization. For example, magnesium anodes preferably contain somewhat over point three percent manganese, as well as a few percent (for example 1 to 5%) aluminum or zinc. Magnesium electrodes used in the experiments referred to in the present specification were made of commercial magnesium alloy known as AZ 31 A, that is containing 3% Al, 1% zinc, 0.2% Mn and 0.15% Ca. Very good results have been obtained with such an alloy, but it's believed that they could be improved by use of a higher manganese content. The current capability of the cell which can be obtained practically, is as a rule just over 50% of the theoretically possible value. This means a current of approximately 1,200 to 1,400 ampere hours per kilogram of magnesium. Using this value as a basis, the life of a cell according to the present invention can be estimated. Graphite electrodes are also very useful, particularly because of their porosity which absorb moisture from the body even when the skin is very dry.

In actual practice the theoretical values, and particularly the theoretical potential values, obtainable from a selected pair of electrodes, is not achieved. Substantial deviation of the value theoretically calculated arises. The reason for this variation may be found in factors difficult to control or to establish; for example the constantly changing character of the surface contact of the electrodes with the skin; the surface characteristics of the human skin itself, which after all does affect the operation of the cell. It has been determined experimentally, however, that approximate, average mean values can be maintained over a substantial period of time, particularly if coupled with small suitable electrical loads combined with a floating or buffer battery.

Figure 14:
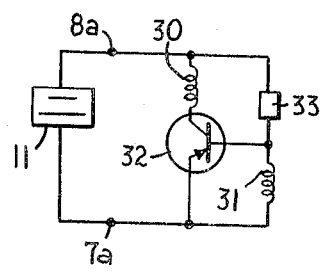
FIG. 14 is a circuit diagram of a transistor circuit for a wristwatch, supplied by the cell.
Figure 15:
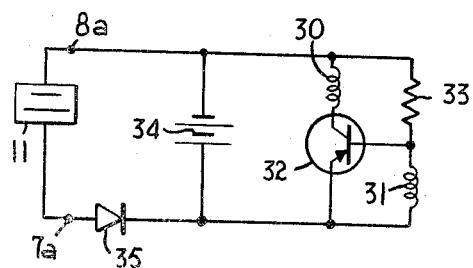
FIG. 15 is a circuit diagram similar to FIG. 14 and utilizing buffer or floating battery in the electrical circuit.

Referring now in detail to the drawings, and in particular to FIGS. 1 to 3: A circular disc 1 is provided on one side with projecting pins, bulges, protuberances and the like 1a, and forming the common or non-noble electrode, for example made of magnesium. The noble metal electrode, FIG. 2 consists of a disc of similar outline and having holes where the protuberances or discs 1a of FIG. 1 are located, the holes being of somewhat larger diameter than the protuberances 1a. Disc 2 may consist, for example of silver or iron or steel, covered with a silver layer. The holes 2a are arranged and sized such that discs 1 and 2 may assemble against each other, with an insulating layer therebetween, such that protuberances or stubs 1a fit through the holes 2a and form with the disc 2 an even surface. The insulating layer may be an insulating adhesive 3, completely taking up the space between the protuberances 1a and the circumference of holes 2a, as well as between discs 1, 2, thus completely electrically separating the two discs 1, 2, from each other. The diameter of the cell may be, for example, about one inch, and may be utilized as the back or bottom surface of a wristwatch. An electrical circuit for such a watch is shown in FIGS. 14 and 15. Referring now to FIGS. 14 and 15, cell 11 formed of the electrodes 1 and 2 is connected through drive coil 30 of the electrical clock with the collector of a transistor 32. The other and non-noble electrode of the cell 11 is connected to the emitter of the transistor 32. The base-emitter circuit is closed by a control coil 31, and the base-collector circuit of the transistor is closed by a resistance 33. FIG. 15 illustrates a similar circuit, except that transistor 32 is not connected directly to the cell 11, but that a buffer or floating battery 34 is connected into the circuit. A rectifier 35, connected between the line of cell 11 and the circuit including the buffer battery, is provided to prevent any discharge of the battery through the cell. The remainder of the circuit according to FIG. 15 is identical to that of FIG. 14.

The circuit of the electrical clock itself, both according to FIGS. 14 and 15, is, except for the novel cell 11, known. A mechanically movable magnetic element, such as a permanent magnet, or a soft iron material, is attracted by current flow through collector coil 30. Control of the current impulses through collector 30 is obtained from the emitter-base circuit coil 31 which switches the transistor 32 to conductive condition when the magnetic state of coil 31 is disturbed, for example by an initial movement of a permanent magnet pass coil 31. The drive power for the arrangement is obtained from cell 11 (FIG. 14) or from a battery 34, which is constantly being charged by cell 11 (FIG. 15). The current requirement of such an electronic timepiece according to FIGS. 14 and 15 is approximately 10 to 30 μA., and the energy required is in the order of 10 to 20 micro-watts. Thus, cells prepared according to the data given above, and providing the current set forth in the tables above, can adequately supply the electrical requirement of an electronic wristwatch. FIG. 14 does not require a constant current, but only current pulses, as a magnetic part of a balance wheel swings pass coils 30, 31.

An insulating adhesive to join the two electrodes 1, 2 of FIGS. 1 to 3 may consist of a resin such as epoxy or lacquer adhesive.

Figure 4:
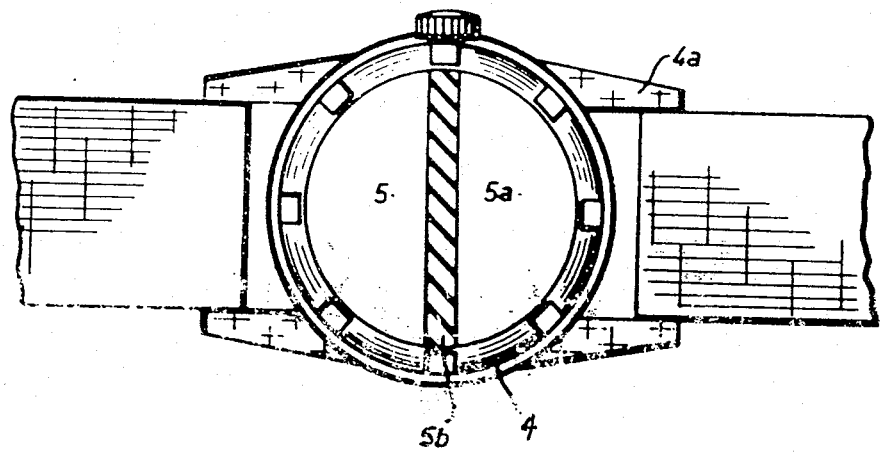
FIG. 4 shows an embodiment of the cell as the base for a wristwatch.
Figure 5:
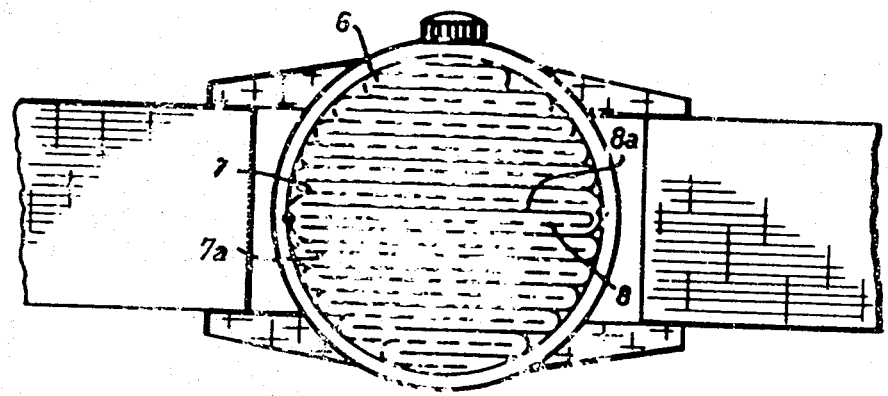
FIG. 5 is another form of the cell as the back plate of a wristwatch.
Figure 5A:
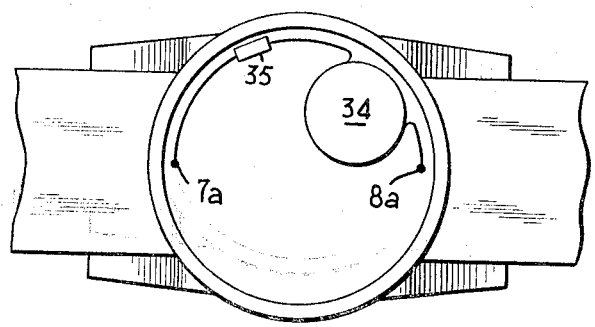
FIG. 5A is a view of the base of the wristwatch with the electrode back removed, showing the location of an electrically floating battery.

Referring now to FIG. 4, the base or bottom of a wristwatch has the usual watch strap attachment lugs 4a. The bottom of the element itself is formed of two semi-circular electrode regions 5, 5a, separated from each other by an insulating strip 5b. Electrode 5 may again consist of magnesium, and electrode 5a of a layer or leaf of silver. Another embodiment of the invention as illustrated in FIG. 5 shows the bottom or base 6 of a watch on which the electrodes are secured in the form of wires. The solid lines illustrate electrically connected wires 7, forming one electrode; the dashed lines indicated the other electrode 8, also formed by electrically connected wires. As shown in FIG. 5, the electrodes are interleaved comb-like, without touching each other. 7a and 8a are the terminal points of the two electrode systems. The inner portion of the base of the watch (see FIG. 5A) is provided with a pair of terminal connections 7a, 8a, which are in turn electrically connected to a floating or buffer battery 34, shown in their electrical connection in FIG. 15, for an electronic watch. Of course, connecting points 7a, 8a may also directly connect to the transistor, as electrically shown in FIG. 14.

The wire electrodes according to FIG. 5 may consist of thin wires adhesively secured to an insulating base 6. Alternatively, the electrodes may be applied in the form of a printed circuit on a base of the watch. In the illustration of FIG. 5 all the electrode elements are connected in parallel. It is of course also possible to connect the electrode elements in series in order to obtain higher terminal potentials.

Figure 6:
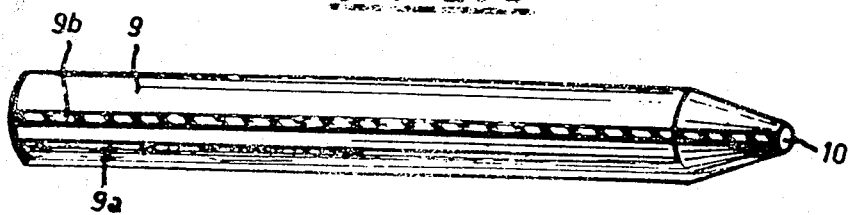
FIG. 6 is a cell formed as a cylindrical handle.

FIG. 6 illustrates electrodes applied to two longitudinal halves of a cylindrical rod; electrodes 9, 9a are separated from each other by an insulating adhesive 9b. A tiny light bulb 10 may be added to one end of the rod, having each electrode thereof connected to electrodes, 9, 9a of the rod. Grasping the rod by hand, and touching both of the electrodes simultaneously, causes current to flow through the bulb 10, thus forming a miniature flashlight.

Figure 7:
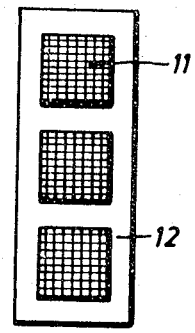
FIGS. 7 and 8 are illustrations of a cell for use with a wristwatch strip.
Figure 8:
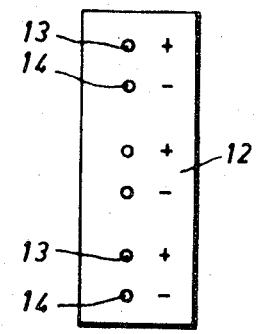

FIG. 7 and FIG. 8 illustrate a wristwatch strap 12, having several substantially rectangular electrode systems 11 applied thereto in grid form. Grids 11 consist of wires which cross each other, and which are insulated against each other at their crossover points. Respective parallel wires extending in one direction form one electrode system and are connected to terminal 13 (FIG. 8). The wire extending in a direction perpendicular thereto is connected to the other terminal, 14, and the terminals 13, 14 of individual grid systems can be connected in series, or parallel, as desired. The connecting wires for the watch itself can then be applied to the inside of the watchband, or to any surface or edge region thereof. The watchband 12 itself consists of insulating material, for example of fabric textile. The electrode wires themselves are in this case preferably woven into the textile. As the watch strap is secured to the wrist of the user systems 11 are brought into contact with the skin and thus generate electricity.

Figure 9:
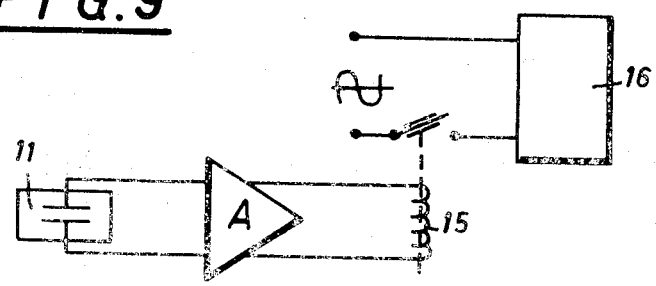
FIG. 9 is a schematic diagram of a touch sensitive switch, supplied over an amplifier by means of the cell of the present invention.

FIG. 9 is a schematic illustration of cell 11 operative as a touch control switch for control of an element 16. The terminal connections of the cell 11 are connected to an amplifier A having a relay 15 in its output circuit. Relay 15 closes the circuit to controlled member 16. When element 11 is touched, for example by the finger or by hand, the resulting potential, amplified in amplifier A causes operation of relay 15 in order to connect, or disconnect, controlled element 16. Such a touch control switch has wide utility, for example to control elevators, automatically opening doors, vending machines, or for simple control of electrical machinery or devices. It may likewise be used as a safety switch to disconnect power to a controlled unit 16 if a part of the human body comes in contact with the element 11.

Figure 12:
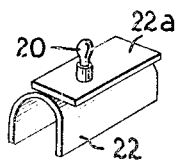
FIG. 12 is a lamp on a bridge piece formed by the cell.
Figure 10:
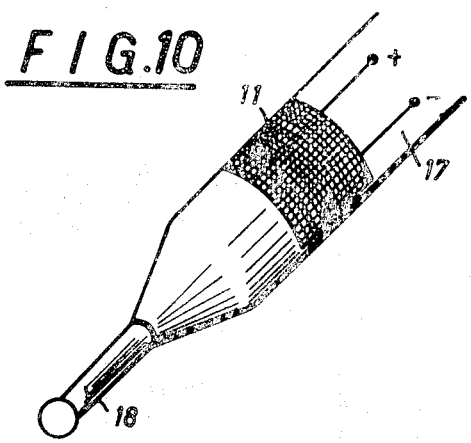
FIGS. 10 and 11 are arrangements of the cell in combination with cylindrical handles used in the dental profession.
Figure 11:
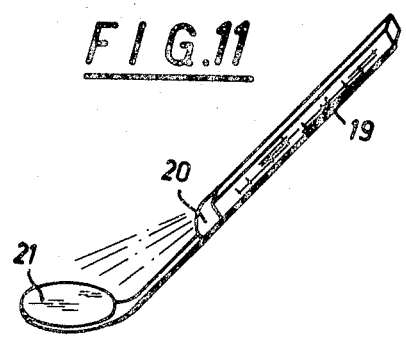

FIG. 10 illustrates a grid-form electrode system, similar to grids 11 of FIGS. 7 and 8, applied to the cylindrical handle 17 of a dental drill 18. FIG. 11 shows the electrode system on a handle 19 of a dental mirror 21. The electrodes 19 supply current to a tiny lamp 20, illuminating mirror 21. Instead of the handle 19, the electrodes can also be applied to the backside of mirror 21, in such a manner that when the back side of the mirror is placed against the skin in the interior of the ORAL cavity of the patient or against the tongue or gums, or the inside of the cheeks, both electrodes of the cell are bridged by skin. In a similar manner, see FIG. 12, the electrode system is applied to the inside of a U-shaped saddle 22, which can be applied in the form of a bridge over the teeth. Upon touching the gums both electrodes of the cell applied on the inisde of the saddle 22 supply electricity to a tiny bulb 20, secured to a reflector 22a on the top of the saddle, to supply light to the interior of the oral cavity.

FIG. 9A, as has been previously mentioned, illustrates the electrical connection of a cell 11 to a motor 40. Of course, a connection including a buffer battery and rectifier, similar to battery 34 and rectifier 35, can be used in connection with FIG. 9A as well.

The present invention thus relates of a cell formed of two electrodes which are insulated from each other and designed to be brought into contact with an electrolyte formed by the human skin. The cell is adapted for connection to a load to supply output current to do useful work, for example to supply electrical energy to drive an electronic wristwatch, supply energy for tiny light bulbs, or act as a source of input signals for control amplifiers.

What is claimed is:

1. A galvanic cell for generating an external electrical current when brought in contact with human skin, comprising an anode consisting of a material selected from the group consisting of magnesium, zinc, aluminum, beryllium and alloys thereof, a cathode consisting of a material taken from the group consisting of silver, gold platinum, nickel, copper, iron and alloys thereof, carbon and graphite; means securing said electrodes to a support in insulated relation with one another; said electrodes having substantially coplanar exposed surfaces to engage different areas of skin when in operation, said electrodes being formed of two superimposed plates, one of said plates being formed with apertures and the other plate being formed with projections fitting in said apertures and being slightly smaller than said apertures to provide electrical insulation therefrom, said projections terminating flush with the surface of said apertured plate, whereby when said cell is brought into contact with the skin, both said electrodes will make contact therewith; and means connecting an external electrical circuit to said electrodes to receive and utilize the current developed when said electrodes are in contact with the skin.

2. A cell as claimed in claim 1, wherein said anode consists of a magnesium alloy containing at least 2/10% of manganese, and from 1 to 5% of aluminum and zinc.

3. A cell as claimed in claim 1, wherein said electrodes comprise elongated elements extending parallel to each other and spaced from each other to provide insulation.

4. A cell as claimed in claim 3, wherein said elongated elements consist of wires forming said electrodes.

5. In an electrical wrist-watch having a transistor oscillator; the improvement in combination therewith being means supplying electric power to the transistor of said transistor oscillator, said means consisting of a galvanic cell for generating an external electrical current when brought in contact with human skin and comprising an anode consisting of a material selected from the group consisting of magnesium, zinc, aluminum, beryllium and alloys thereof, a cathode consisting of a material taken from the group consisting of silver, gold, platinum, nickel, copper, iron and alloys thereof, carbon and graphite; means securing said electrodes to a support in insulated relation from each other, said electrodes having substantially coplanar exposed surfaces to engage different areas of the skin when in operation; said electrodes being formed of two superimposed plates, one of said plates being formed with apertures and the other of said plates being formed with projections fitting in said apertures and being slightly smaller than said apertures to provide electrical insulation therefrom, said projections terminating flush with the surface of said apertured plate, whereby when said cell is brought into contact with the skin, both said electrodes will make contact therewith; and means connecting said electrodes to said transistor oscillator.

6. An electrical wrist-watch as claimed in claim 5 having strap means adapted to secure said wrist-watch to the arm of the wearer and wherein said electrodes are formed of wires applied to the back surface of said strap.

References Cited by the Examiner

UNITED STATES PATENTS

| | | | |
|---|---|---|---|
| 456,219 | 7/1891 | Grauert | 136—100 |
| 489,832 | 1/1893 | Reud | 136—100 |
| 539,484 | 5/1895 | Newton | 136—100 |
| 551,880 | 12/1895 | Wilcox | 136—100 |
| 713,005 | 11/1902 | Hunt | 136—100 |
| 2,045,729 | 6/1936 | Ruppe. | |
| 2,215,213 | 9/1940 | Ellis | 175—183 |
| 2,547,907 | 4/1951 | Fry et al. | 136—100 |
| 2,564,495 | 8/1951 | Mullen | 136—100 X |
| 2,961,587 | 10/1960 | Aeschmann | 318—132 |
| 2,978,862 | 4/1961 | Epperlein | 136—173 |
| 2,986,683 | 5/1961 | Lanet et al. | 318—132 |

OTHER REFERENCES

Jones: Inorganic Chemistry, 1947, pp. 100–101.

WINSTON A. DOUGLAS, *Primary Examiner.*

LEO SMILOW, G. F. BAKER, B. J. OHLENDORF,
*Assistant Examiners.*